United States Patent [19]
Cocca et al.

[11] Patent Number: 5,541,681
[45] Date of Patent: Jul. 30, 1996

[54] CAMERA APPARATUS AND METHOD FOR FILM DOUBLE EXPOSURE PREVENTION

[75] Inventors: J. David Cocca, Pittsford; John R. Siemer, Rochester; Marcello D. Fiscella, Fairport, all of N.Y.

[73] Assignee: Eastman Kodak Company, Rochester, N.Y.

[21] Appl. No.: 414,084

[22] Filed: Mar. 31, 1995

[51] Int. Cl.$^6$ ........................................................ G03B 7/00
[52] U.S. Cl. .............................................. 354/21; 354/207
[58] Field of Search ........................ 354/21, 207; 326/11, 326/35; 371/36, 37.9, 69.1

[56] References Cited

U.S. PATENT DOCUMENTS

| | | | |
|---|---|---|---|
| 4,994,833 | 2/1991 | Cocca | 354/207 |
| 5,030,978 | 7/1991 | Stoneham et al. | 354/21 |
| 5,032,854 | 7/1991 | Smart et al. | 354/21 |
| 5,237,156 | 8/1993 | Konishi et al. | 355/40 X |
| 5,321,455 | 6/1994 | Cocca | 354/207 |
| 5,467,155 | 11/1995 | Miyazaki et al. | 354/21 |

*Primary Examiner*—Howard B. Blankenship
*Attorney, Agent, or Firm*—Francis H. Boos, Jr.

[57] ABSTRACT

A camera and method of camera operation for automatically determining usage condition of film in a cartridge utilizing a cartridge radial bar coded data disc to discriminate among a plurality of possible initial angular settings of the film spool during a film loading operation. The possible initial angular settings can be representative of exposed, partially exposed, fully exposed or processed film. At the start of film loading, the spool is rotated in the reverse direction and bar code element transition counts sensed by a pair of angularly spaced opto-sensors are accumulated. A count comparison between the two sensors is initially made to determine if the film is unexposed and, if so, film loading proceeds in normal manner, otherwise an alternative action is taken. In a simple camera, the loading is terminated. In a more sophisticated MRI capable camera, when the count comparison indicates the film is not unexposed, the camera controller calculates an angular position of one of the sensors relative to a predetermined reference position on the data disc, based on sensed element transitions and known element widths, to discriminate among spool settings indicative of partially exposed film, fully exposed film and processed film with appropriate actions initiated depending on the discriminated spool position.

13 Claims, 7 Drawing Sheets

CAMERA APPARATUS AND METHOD FOR FILM DOUBLE EXPOSURE PREVENTION

FIELD OF THE INVENTION

The invention relates generally to the field of photography, and in particular to apparatus and method for preventing double exposure of film in a photographic camera.

BACKGROUND OF THE INVENTION

In recent years, photographic film cartridges have been proposed in which the film strip is completely enclosed within the cartridge and the film is loaded into the camera by simply causing the cartridge film spool to be rotated in the unwinding direction. A motor drive in the camera would generally be used for this purpose. Simplicity in film loading is one reason for this arrangement.

A problem with this arrangement, however, is that, unlike prior conventional film cartridges, there is no film leader extending out of the cartridge to indicate that the film is unexposed. Consequently, arrangements have been proposed to provide a visual indication of the exposure condition of the film and also to prevent loading of exposed film into the camera. This is particularly useful if the photographer wishes to switch cartridges to a different film type midway through the film exposures in the first cartridge. Commonly assigned U.S. Pat. No. 4,994,833 and the applications cross-referenced therein are representative of such proposals. However, such arrangements have the drawback that they require specially designed cartridge configurations and special mechanical sensors built into the camera to determine the status of the film in the cartridge and implement the double exposure prevention.

In commonly assigned U.S. Pat. Nos. 5,030,978 and 5,032,854 film cartridges are disclosed that utilize a rotatable radial bar coded disc element to provide information about the film in the cartridge, such as film manufacturer, film type, etc. These patents describe apparatus and methods for reading the bar codes during rewind operation to position the spool and the associated bar coded disc at a particular angular position of the spool so as to align visual indicators on the cartridge that indicate the exposure condition of the film, e.g. unexposed, partially exposed or exposed. In the '854 patent, a simple locking feature is shown that holds the spool in the desired indicator position. These patents do not disclose any provision for enabling the camera to automatically prevent reloading of exposed film or of enabling reloading of partially exposed film to an available frame position without the use of the special cartridge configuration and mechanical sensors of the types considered in aforementioned patent 4,994,833.

Commonly assigned U.S. Pat. No. 5,321,455 shows apparatus and method for using the bar coded disc to sense the initial parked angular setting of the film spool and thereby determine the film usage condition as part of a film loading operation. In this disclosure, when a cartridge is inserted into a camera and the film loading operation initiated, the disc is rotated and a single bar code sensor is used to detect transitions between bar elements, in effect counting the number of elements passing under the sensor from the initial setting to some reference point on the disc. Knowing the general format of the code, e.g. an interleaved 2-of-5 code, certain ranges of element counts will uniquely indicate the initial angular (parked) setting of the disc. The patent shows an arrangement whereby four initial settings can be determined, "Fresh" (Unexposed), "Partial" (Mid-roll interrupt: MRI), "Exposed" and "Developed"(Processed). Although operable for its intended purpose, it has been found that the use of a single sensor arrangement that relies solely on the count of elements to provide the initial setting indication is not entirely satisfactory. Specifically, the ability to discriminate the element counts for all four ranges, and even for only three ranges if the Processed position is not used, is not as reliable as would be desired. Accordingly, it is necessary to provide a more reliable arrangement for dynamically, determining, during an initial film loading operation, the angular setting of the film spool to provide reliable discrimination among at least three and preferably four initial settings to give an automatic indication of the usage condition of the film in the cartridge. The importance of reliability is the fact that there is only one chance to read the disc correctly since, once the spool is moved, the initial setting of the cartridge is lost.

SUMMARY OF THE INVENTION

Camera apparatus of the invention is adapted to detect usage condition of film in a cartridge of the type having a light-tight housing with at least one film usage indicator positioned thereon, and having a rotatable film spool and a data disc that is rotatable with the spool. The data disc bears a machine readable bar code comprised of wide and narrow elements indicative of characteristics of film in the cartridge and an extended quiet zone element, the elements being of predetermined angular widths. The disc also has at least one fixed reference position thereon, the initial angular setting of the disc relative to the fixed reference position on the cartridge housing being indicative of the film usage condition.

According to the invention, the camera apparatus comprises a film cartridge receiving chamber; first and second optical bar code sensors that are located in the cartridge receiving chamber at predetermined angular spaced apart positions in fixed relation to the reference position on the cartridge housing when the cartridge is inserted into the receiving chamber; and means for initiating rotation of the spool as part of a film loading operation in the camera.

The camera apparatus further includes a camera controller including logic means and first and second accumulator means for accumulating counts of transitions between elements on the data disc detected by the first and second sensors, respectively, as the data disc rotates. The logic means is programmed to be initially responsive to a first relative count condition determined between the first and second accumulator means for completing loading of the film into the camera if a predetermined relative transition count condition is met between the two sensors. Otherwise the logic means enters an alternative action in the film loading operation, whereby positioning of an exposed film frame in a film exposure chamber of the camera is prevented.

In a preferred apparatus of the invention, if the predetermined relative count condition is not met, the microprocessor is programmed to then determine an initial angular spacing between one of the sensors and a reference position on the data disc, the initial angular spacing being a function of the parked position of the spool, and to initiate one of a plurality of alternative film loading operations based on the determined angular spacing, one of the alternatives being termination of said film loading operation.

In accordance with another aspect of the invention, a method of camera operation is provided for automatically determining usage condition of film wound on a film spool in the film cartridge described above as part of a film loading operation. The method comprises the steps of initiating rotation of the data disc as part of the film loading operation; counting, with first and second sensors, transitions between bar code elements on the data disc; and completing loading of film into the camera from the cartridge if a predetermined relative transition count condition is met between the two sensors, otherwise initiating an alternative action in the film loading operation.

In a further feature of the method, if the predetermined relative count condition is not met, an initial angular spacing between one of said sensors and a reference position on the data disc is then determined, the initial angular spacing being a function of the parked position of the spool. Based on the determined angular spacing, one of a plurality of alternative actions in the film loading operation is initiated, one of the alternative actions being termination of said film loading operation. Others of the alternative actions comprise (a) detecting a partially exposed film condition and advancing the film to the first available unexposed film frame location, (b) detecting a fully exposed condition and placing the film spool and disc in an exposed parked position and (c) detecting a processed condition and placing the film spool and disc in either an exposed or processed parked position.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
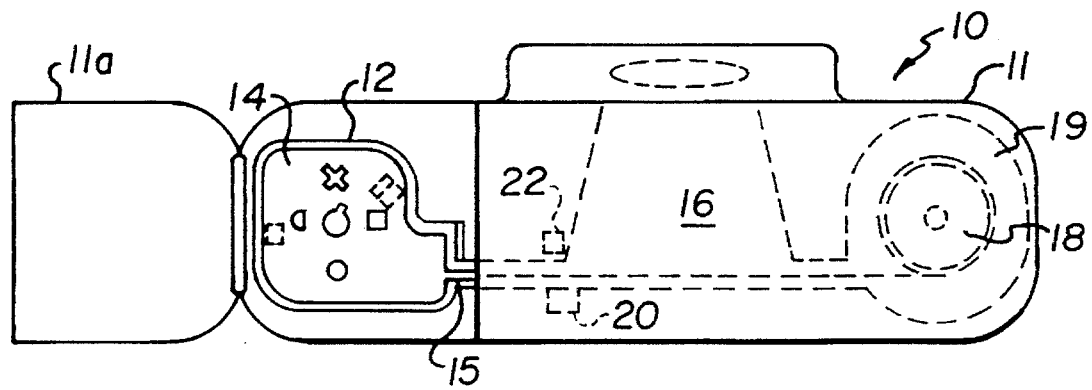
FIG. 1 is a schematic top view of a camera embodying the present invention.
Figure 2:
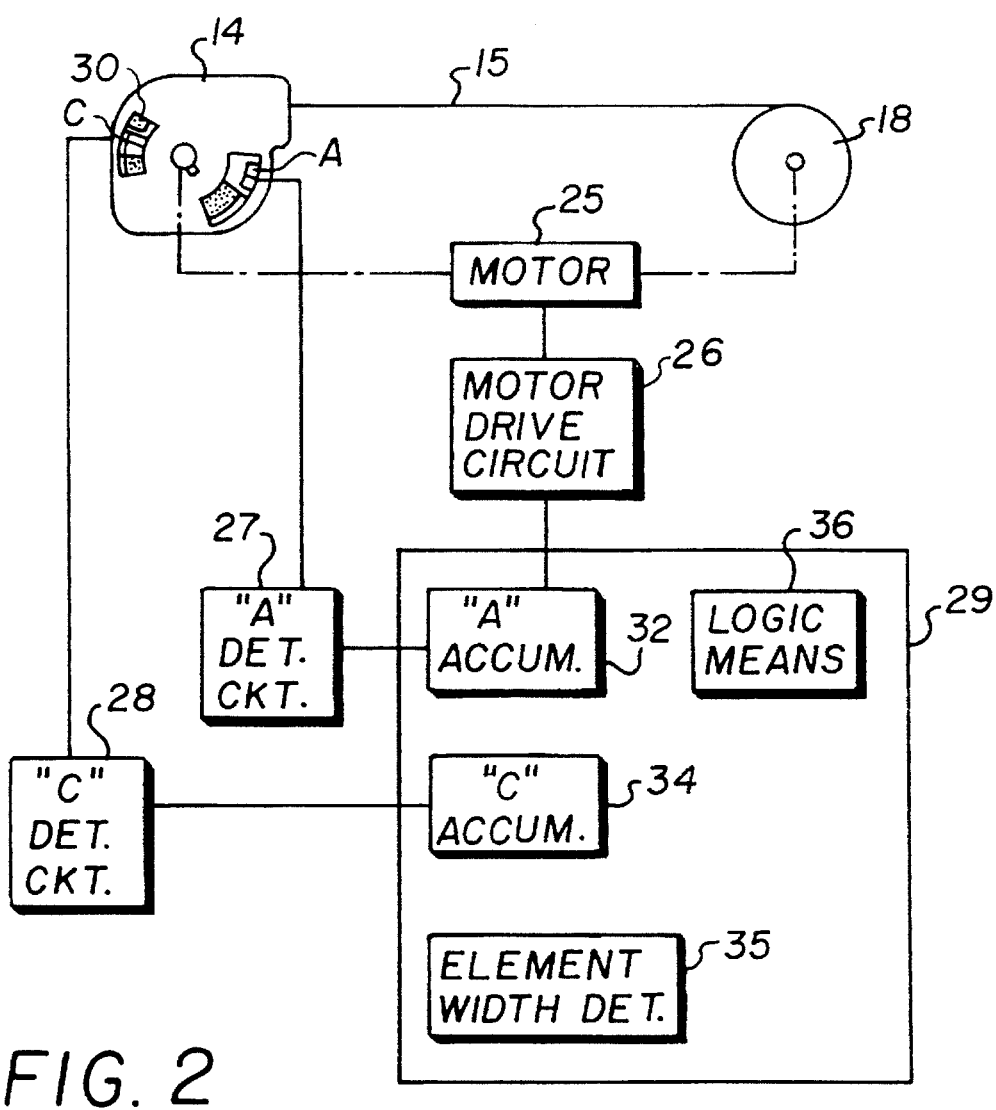
FIG. 2 is a schematic bottom view illustration of portions of the camera of FIG. 1.
Figure 4:
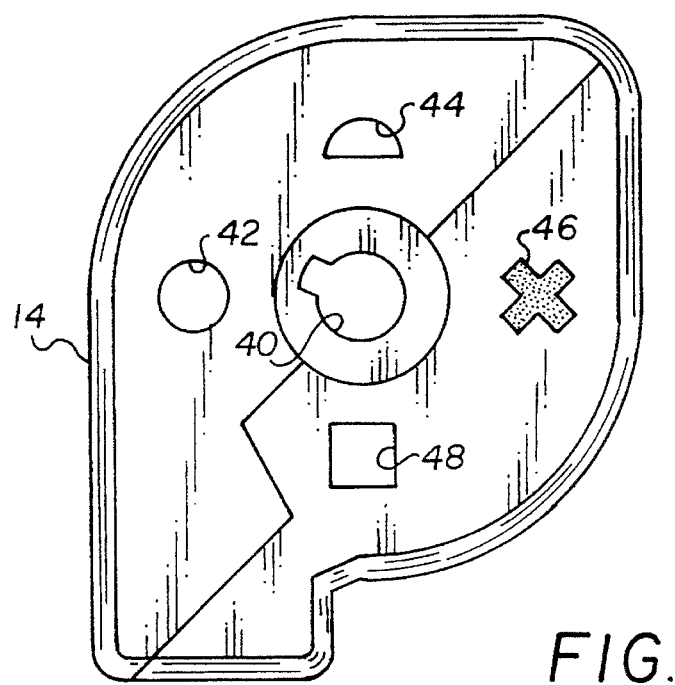
FIGS. 3 and 4 are end views of a film cartridge of a type with which the present invention is intended to operate.

Referring now to FIGS. 1 and 2, a camera 10, in which the present invention is embodied, is comprised of a camera body 11 and a hinged cover 11a providing access to an end loading film cartridge chamber 12. A film cartridge 14, which is described in more detail later, is shown positioned in receiving chamber 12 with film 15 protruding from the cartridge and extending past a film exposure frame 16 to a takeup spool 18 located in a film takeup chamber 19. Perforation sensing means for metering film at the film exposure frame may comprises an infra-red light emitting diode 20 and a light sensor 22 mounted adjacent the exposure frame 16. A film drive motor 25 (FIG. 2) is mounted within camera body 11 and is suitably coupled to drive the spool of film cartridge 14 and take-up spool 18 to perform film loading, winding and rewinding functions in the camera 10 in response to motor drive circuit 26 under control of signals from camera logic and control circuit 29. Logic and control circuit 29 includes a logic unit 36 which may comprise a microprocessor, ASIC, gate array or programmable logic device providing control signals for various camera functions. First and second opto-sensors A and C are mounted in the camera at the lower end of the cartridge receiving chamber 12 to sense radial bar code elements of a data disc 30 mounted at one end of the film cartridge 14. The sensors A and C are located at predetermined angularly spaced apart positions in fixed relation to a reference position on the cartridge, as will be explained in more detail below.

Film cartridge 14 is preferably of the thrust type in which the film 15 is normally entirely enclosed within the light-tight housing of the cartridge prior to being loaded into the camera. During a normal film loading operation, motor 25 is activated in known manner by motor drive circuit 26 under the control of logic and control circuit 29 to initially rotate the film spool in the reverse, i.e. rewinding, direction for reading of the bar code elements on the data disc 30 to provide information to the camera concerning characteristics of the film in the cartridge, namely ISO film speed number, film type and film length (number of exposures). The spool is then reversed and rotated in the unwinding direction to thrust the film 15 out of the cartridge toward the takeup spool 18. During the initial rotation in the rewind direction, the data disc elements are also sensed as described hereafter for determination of the initial angular setting of film spool in order to obtain the exposure status of the film in the cartridge in accordance with the present invention. Once the film engages the take-up spool 18, the drive motor 25 coupled to the take-up spool 18 serves to pull the film from the cartridge to complete the loading process. At the start of the loading process, sensors A and C are activated and their output signals A and C are detected in detector circuits 27, 28, respectively, and applied to accumulators 32 and 34, respectively. Accumulators 32 and 34 serve to accumulate counts of transitions between elements on the radial bar coded data disc which is used in logic means 36 to determine the initial angular setting of the film spool. The output of the C sensor detector is also supplied to an element width detector 35 to discriminate between wide and narrow elements for mapping the digital words represented by the bar code. This is used both for reading the bar code as well as determining relative angular position of the C sensor to the cartridge as will be explained below.

Figure 3:
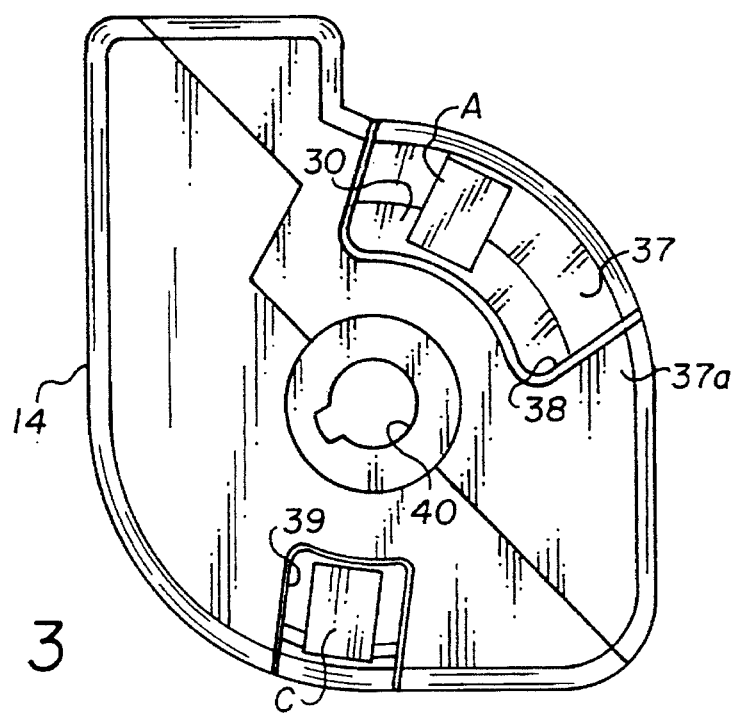

In FIG. 3, the lower end of cartridge 14, also shown in FIG. 2, is provided with an externally readable data disc 30 nested between interior and exterior end walls 37 and 37a, respectively. The data disc is attached to film spool 40 so as to be rotatable therewith. The exterior end wall 37a is provided with cutouts 38 and 39 to allow optical access to the data disc 30 by opto-sensors A and C, respectively. The upper end of cartridge 14, also shown in FIG. 1, is provided with a plurality of cutouts 42, 44, 46, 48 of prescribed shapes that give a visual exposure indication (VEI) of the condition of the film in the cartridge. This is accomplished by means of a contrasting color flag, rotatable with the film spool, which is seen through a prescribed one of the cutouts depending on the parked position (angular setting) of the film spool 40. The details of the VEI mechanism and a method for parking of the spool at appropriate VEI positions are described more fully in commonly assigned U.S. Pat. Nos. 5,347,334 and 5,032,854 the disclosures of which are incorporated herein by reference.

As disclosed in the '334 patent and illustrated in FIGS. 5a–5d herein, the radial bar code imprinted on the illustrated data disc 30 is comprised of data segments 50 and 52, each consisting of a series of wide and narrow elements 54 and 56, respectively. Segment 50 comprises an interleaved 2-of-5 radial bar code representing the ISO film speed and film type information while segment 52 is a custom three element segment representing film length information. A synchronizing segment 58 consisting of an extended "quiet zone" element is also provided. The elements in the data segments are of predetermined known widths. In the preferred embodiment, for example, each wide element has a width of 20°, each narrow element has a width of 8° and the quiet zone element has a width of 184°.

It will be seen from FIG. 1 that the cartridge receiving chamber 12 and the cartridge 14 have mating shapes which constrain the cartridge to a fixed position in the chamber. Thus the optical bar code sensor A and C are located in the cartridge receiving chamber 12 at predetermined angularly spaced positions relative to the reference VEI indicator positions 42-48 and, by association, to the respective parked positions of the data disc. By determining the parked position of the data disc at the outset of a film loading operation, it is therefore possible to automatically determine whether film loading should proceed and, in a mid-roll interrupt capable camera, to signal the camera controller 29 that a partially exposed film is being loaded so as to prevent placing a previously exposed film frame at the film exposure gate 16. The manner in which the parked position of the data disc (and spool) is determined in accordance with the present invention will now be explained.

Figure 5A:
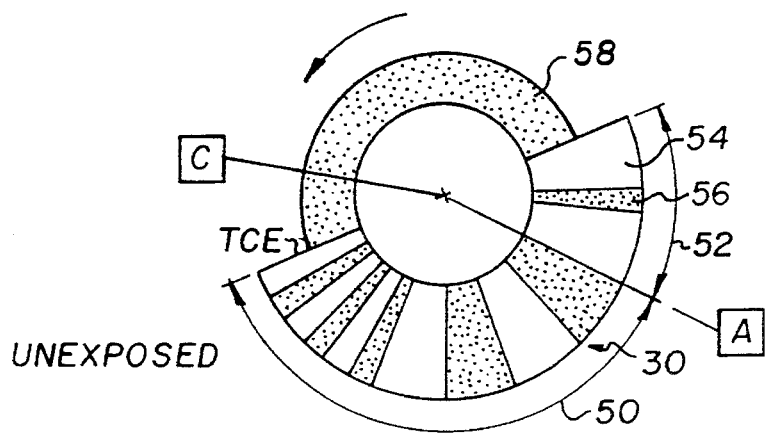
FIGS. 5a–5d are illustrations of the data disc portion of the film cartridge at different initial parked settings that are useful in explaining the operation of the invention.
Figure 5B:
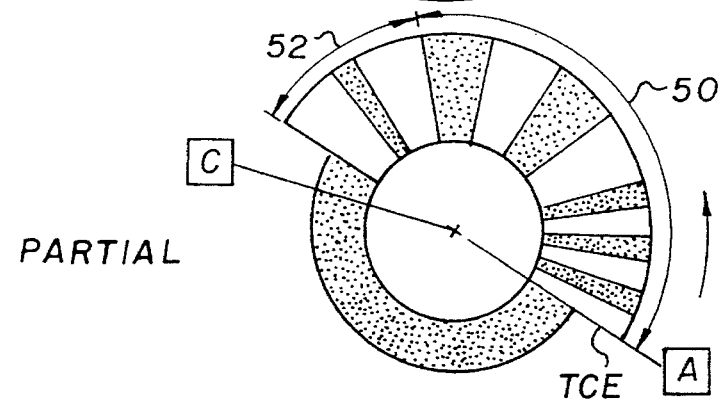
Figure 5C:
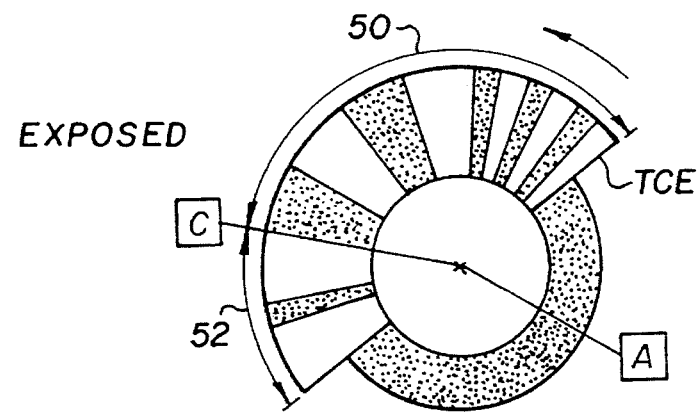
Figure 5D:
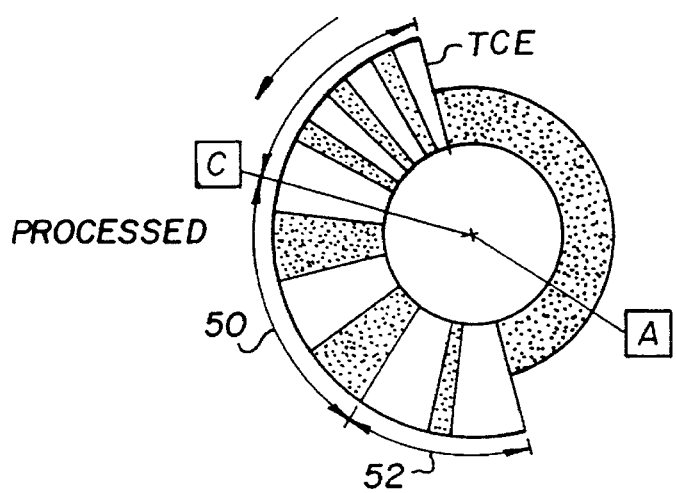

In FIG. 5*a*, the parked position of the data disc relative to the positions of sensors A and C is shown for the case when the film in the cartridge is unexposed. In this case the VEI flag at the upper end of the cartridge would show through the full circle cutout 42. FIG. 5*b* shows the data disc parked position for the partially exposed (MRI) condition, for which the VEI flag would show through the semicircle cutout 44. FIG. 5*c* is shows the parked position corresponding to the fully exposed condition for which the VEI flag shows through the X shaped cutout 46. Finally, FIG. 5*d* is the parked position for the processed condition for which the VEI flag shows through the square shaped cutout 48.

Figure 6:
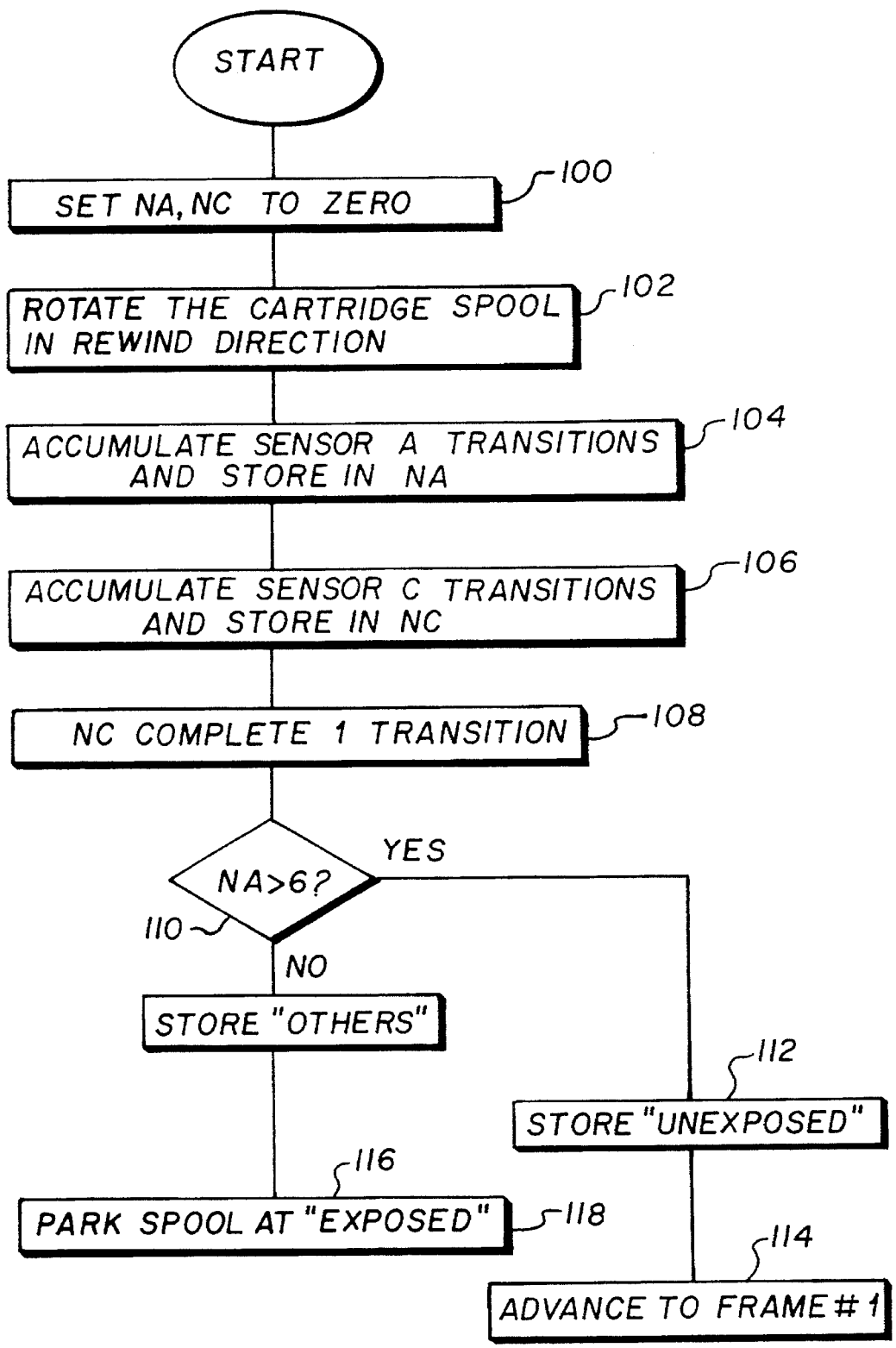
FIGS. 6 and 7a–7b are program flow charts for alternative embodiments of the inventions.
Figure 8A:
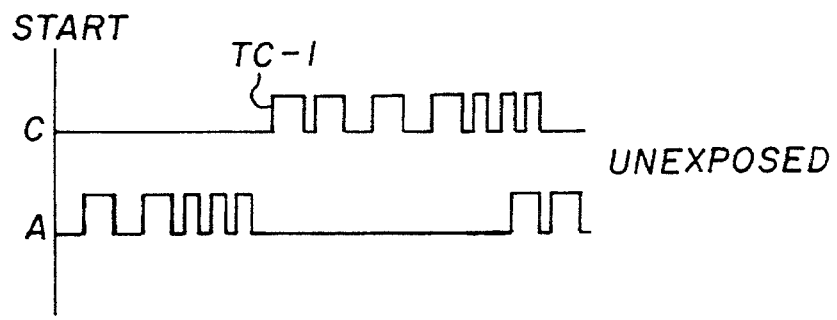
FIGS. 8a–8d are sensor output signal timing diagrams.
Figure 8B:
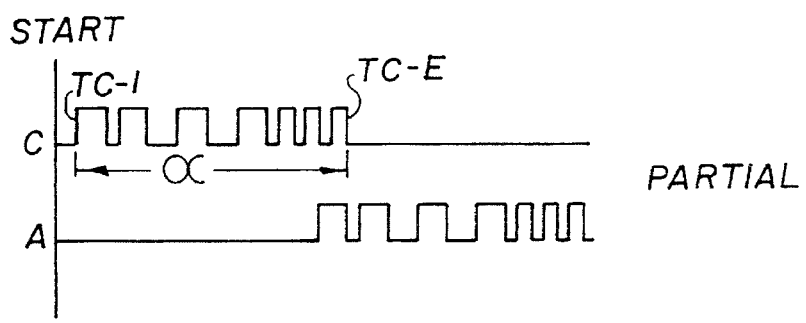
Figure 8C:
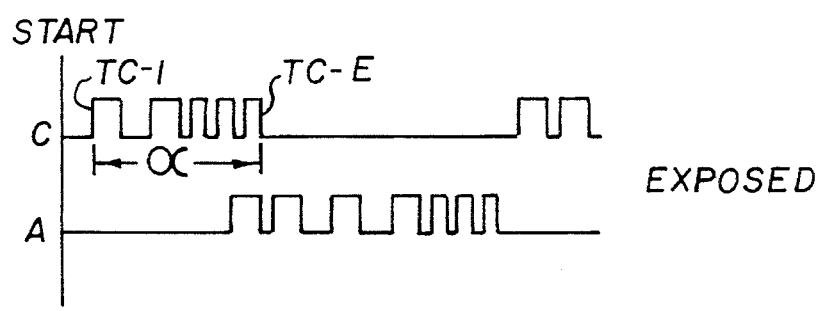
Figure 8D:
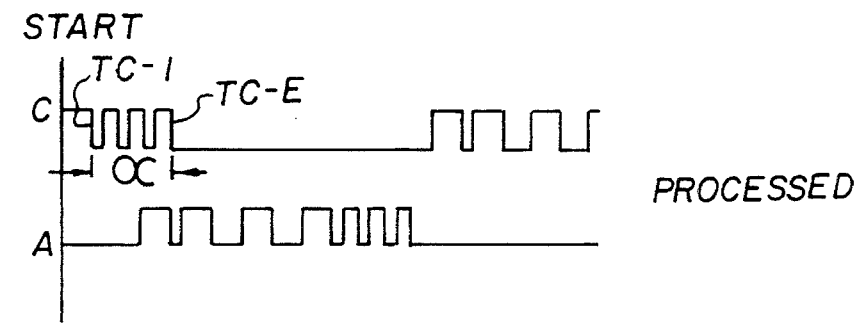

Initially, the sensing operation will be described with reference to the flow diagram of FIG. 6 for a simple camera which will only load cartridges with unexposed film. Such a camera is not designed to be MRI capable, i.e. it does not have the capability of loading cartridges containing partially exposed film and advancing an unexposed frame to the exposure frame 16. When the cartridge is loaded into the camera and the cartridge door 11a closed, the camera controller 29 initializes the counts in accumulators 32,34 to "0" at step 100 and at step 102 begins rotation of the cartridge spool in the rewind direction. As transitions between bar code elements are detected by sensors A and C the transition counts are accumulated in accumulators 32,34, respectively, at steps 104,106. At the time that a first transition is sensed, step 108, query 110 determines if the accumulate transition count from sensor A is greater than a predetermined threshold count (6 in the illustrated example). If yes, the program branches to step 112 to store the condition "Unexposed" in the controller and then to step 114 to cause the film loading process to be completed by reversing the film spool rotation to the thrust direction and advancing the film to position frame number 1 in the camera exposure frame. If, however, the A sensor accumulated count is below the threshold value, step 116 stores the condition "Others" in the controller and step 118 causes the film loading operation to be terminated and parks the spool at the "Exposed" parked position, using a spool parking technique such as described in the aforementioned '854 patent. The operation just described can best be visualized with joint reference to FIGS. 5*a*–5*d* and 8*a*–8*d* which show the data disc orientations and corresponding detected sensor outputs of sensors A and C for each of the parked positions. For the unexposed parked position, sensor C is aligned near one end of the quiet zone 58 and sensor is aligned with the transition between data segments 50 and 52. As seen in FIG. 8*a*, when the spool is initially rotated in the unwinding (counterclockwise) direction of arrow 51, the output of sensor C is low and remains low for most of the quiet zone period while the sensor A output varies between low and high with each sensed element transition. Consequently, when the first transition is sensed by sensor C at position TC-1, the sensor A accumulator count exceeds the threshold value of 6 resulting in the determination of unexposed film in the cartridge. For each of the other parked positions shown in FIGS. 8*b*–8*d*, the A sensor is aligned with the quiet zone and the C sensor is aligned within one or the other of the data segments. As a consequence, when the sensor C reaches its first transition count TC-1, in each instance the sensor A count is below the threshold count, actually at a zero count. Thus, the comparison of counts between sensors A and C gives an unambiguous indication of unexposed film in the cartridge.

Figure 7A:
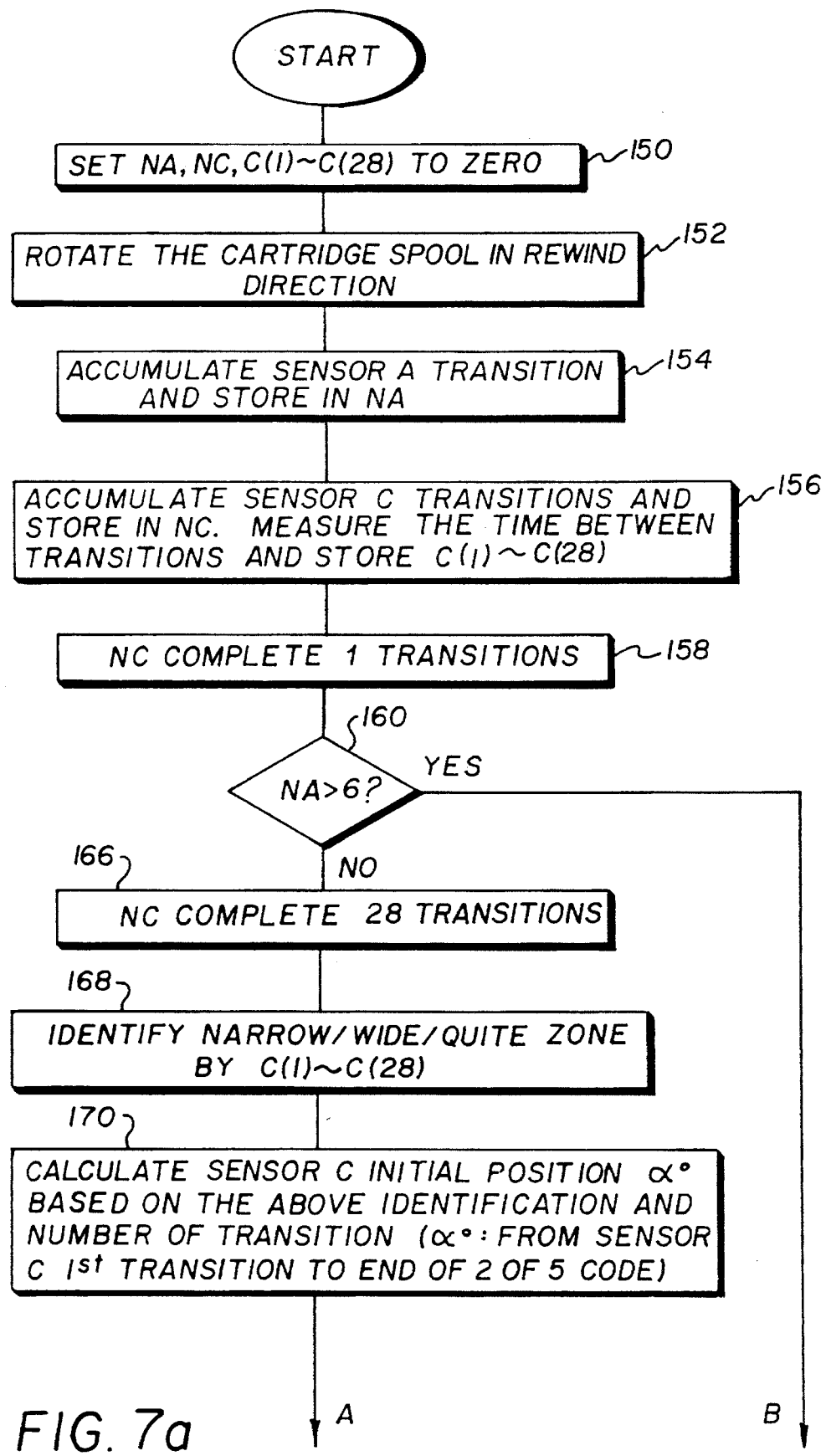
Figure 7B:
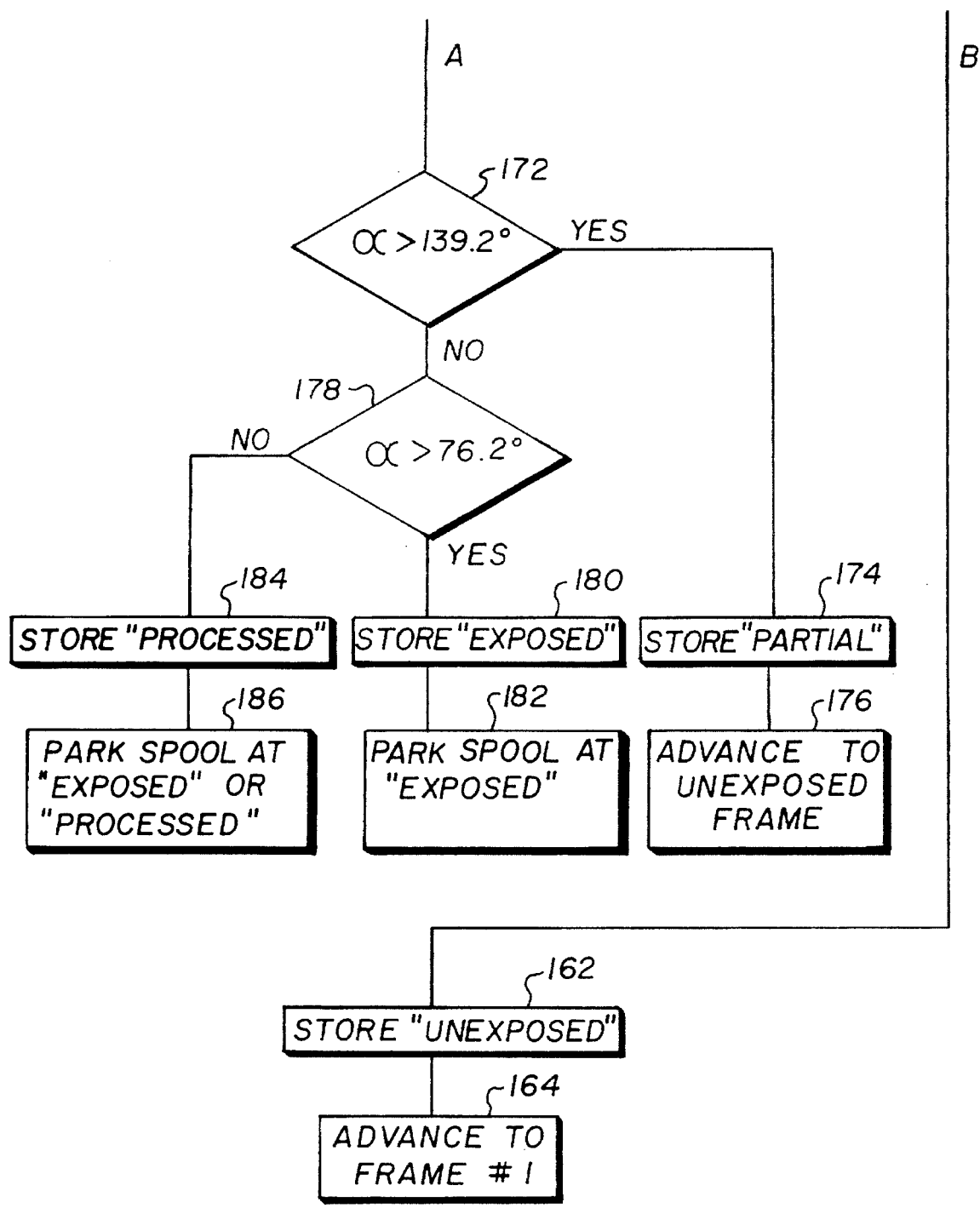

There will now be considered with reference to FIG 7, the operation of the invention in an MRI camera, one which is capable of discriminating partially exposed film and advancing an unexposed frame to the camera exposure frame. Upon loading of the cartridge into the camera and closing of the cartridge door, the accumulators 32,34 and element width detector 35 are initialized to zero at step 150 following which the spool is rotated in the rewind direction at step 152. Step 154 accumulates the sensor A transitions counts in accumulator 32. Step 156 accumulates the sensor C transitions counts in accumulator 34 and discriminates the time between transitions to map the wide and narrow elements which is stored in the element width detector 35. As with the operation described for FIG. 6, step 158 and query 160 determine whether the film is unexposed and, if so, steps 162 and 164 initiated film loading without any further need to check the film condition in the cartridge.

If, on the other hand, the answer to query 160 is "NO", the spool rotation continues in the rewind direction until step 166 determines that the C count accumulator reaches "28" which corresponds to two full revolutions of the spool and data disc. While only a single revolution is necessary, two revolutions is preferred so as to achieve greater reliability in the process. When the C accumulator reaches a count of 28, step C causes the wide and narrow elements to be discriminated according to the sequential position (C)1–C(28). Step 170 then calculates the initial angular position, α, of sensor C relative to the spool position. In the preferred form of the invention, the angle α is determined between the first transition sensed by sensor C and the end, TC-E, of the 2-of-5 bar code data segment 50. If query 172 determines that the α angle exceeds a first threshold value, e.g. 139.2°, the program branches to steps 174 and 176 to identify and store the "Partial" exposed condition and to advance the first available unexposed frame of the film in known manner to camera exposure frame 16 using, for example, indicia marks on the film to discriminate between exposed and unexposed film frames. If a result of query 172 is negative, then query 178 determines if the α angle exceeds a second threshold, e.g. 76.2°, to discriminate between fully exposed (but unprocessed) and processed film. If the former, the program moves to steps 180 and 182 to store the "Exposed" condition and terminate film loading by parking the spool at the exposed parked position. If the latter, the program moves to steps 184 and 186 to store the "Processed" condition and terminate film loading by parking the spool at the processed parked position. If a particular camera is unable to effectively select and park the spool at the "Processed" position, it may alternatively select and park the spool at the "Exposed" position since, for double exposure prevention purposes, the two positions both represent film conditions that should result in aborting a film loading operation. It will be appreciated that the α angle thresholds are a matter of choice based on camera operating characteristics and data disc format and are selected to acceptable tolerance among the actual spool parked positions, e.g. plus or minus one wide element angular width.

The invention has been described with reference to a preferred embodiment. However, it will be appreciated that variations and modifications can be effected by a person of ordinary skill in the art without departing from the scope of the invention.

PARTS LIST 10 camera
11 camera body
11a hinged cartridge chamber cover
12 cartridge receiving chamber
14 film cartridge
15 film
16 film exposure frame
18 film take-up spool
19 film take-up chamber
20 metering LED
22 metering light sensor
25 film drive motor
26 motor drive circuit
27 sensor A detector circuit
28 sensor C detector circuit
29 logic and control circuit
30 data disc
32 accumulator A
34 accumulator C
35 element width detector
36 logic means
38 cartridge cutout - sensor A
39 cartridge cutout - sensor C
40 cartridge film spool
42 unexposed film VEI indicator
44 partially exposed film VEI indicator
46 fully exposed film VEI indicator
48 processed film VEI indicator
50 2-of-5 data code segment
52 three element film length segment
58 quiet zone synchronizing segment
54 wide code element
56 narrow code element A,C data disc opto-sensors

What is claimed is:

1. A method of camera operation for automatically determining usage condition of film wound on a film spool in a film cartridge as part of a film loading operation, the cartridge having a barcoded data disc rotatable with the film spool, the initial parked position of the spool in the cartridge being a function of the film usage condition, the method comprising the steps of:

initiating rotation of the data disc as part of the film loading operation;

counting, with first and second sensors, transitions between bar code elements on the data disc; and completing loading of film into the camera from the cartridge if a predetermined relative transition count condition is met between the two sensors, otherwise initiating an alternative action in the film loading operation.

2. The method of claim 1 wherein said predetermined relative transition count condition is representative of unexposed film in the cartridge and the film is advanced in the camera to the first image frame location on the film.

3. The method of claim 1 wherein, if said count condition is not met, then determining an initial angular spacing between one of said sensors and a reference position on the data disc, said initial angular spacing being a function of the parked position of the spool, and initiating one of a plurality of alternative actions in the film loading operation based on the determined angular spacing, one of said alternative actions being termination of said film loading operation.

4. The method of claim 3 wherein the determined angular spacing is representative of a partially exposed film condition and the film is advanced in the camera to the first available unexposed image frame location.

5. The method of claim 3 wherein the determined angular spacing is representative of a fully exposed film condition and the film loading operation is terminated.

6. The method of claim 3 wherein the determined angular spacing is representative of a processed film condition, the film loading operation is terminated and the film spool is placed in either an exposed or processed parked position.

7. The method of any one of claims 1, 3, 5 or 6 wherein, upon termination of the film loading operation, the film spool is returned to a parked position representative of a fully exposed film condition.

8. The method of claim 6 wherein, upon termination of the film loading operation, the film spool is returned to a parked position representative of a processed film condition.

9. Camera apparatus for detecting usage condition of film in a cartridge of the type having a light-tight housing with at least one film usage indicator position thereon, and having a rotatable film spool and a data disc rotatable with the spool, the data disc having a machine readable bar code comprised of wide and narrow elements indicative of characteristics of film in the cartridge and an extended quiet zone element, the elements being of predetermined angular widths, the initial angular parked position of the spool and data disc relative to a fixed reference position on the cartridge housing being indicative of said film usage condition, the camera apparatus comprising:

a film cartridge receiving chamber;

first and second optical bar code sensors located in the cartridge receiving chamber at predetermined angularly spaced apart positions in fixed relation to said reference position on the cartridge housing when inserted in the receiving chamber;

film drive means for initiating rotation of the spool and data disc as part of a film loading operation in the camera; and a camera controller including a logic unit and first and second accumulator means for accumulating counts of transitions between elements on the data disc detected by the first and second sensors, respectively, as said data disc rotates;

said logic unit being programmed to be initially responsive to a first relative count condition determined between the first and second accumulator means for completing loading of the film into the camera if a predetermined relative transition count condition is met between the two sensors; and otherwise entering an alternative action in the film loading operation;

whereby positioning of an exposed film frame in a film exposure chamber of the camera is prevented.

10. The camera apparatus of claim 9 wherein, if said predetermined relative count condition is not met, said microprocessor is programmed to then determine an initial angular spacing between one of said sensors and a reference position on the data disc, said initial angular spacing being a function of the parked position of the spool, and to initiate one of a plurality of alternative film loading operations based on the determined angular spacing, one of said alternatives being termination of said film loading operation.

11. The camera apparatus of claim 10 wherein a first determined angular spacing is representative of partially exposed film in the cartridge and causes said microprocessor to initiate loading of said film to a first available unexposed frame location on the film.

12. The camera apparatus of claim 10 wherein a second determined angular spacing is representative of fully exposed film in the cartridge and causes said microprocessor to terminate said film loading operation and return the film spool to a parked position representative of said exposed film condition.

13. The camera apparatus of claim 10 wherein a third determined angular spacing is representative of processed film in the cartridge and causes said microprocessor to terminate said film loading operation and return the film spool to a parked position representative of said processed film condition.

* * * * *